US012809461B2

(12) United States Patent
Perko

(10) Patent No.: US 12,809,461 B2
(45) Date of Patent: Nov. 24, 2026

(54) HAPTIC EFFECT DEVICE

(71) Applicant: Aito BV, EJ Amsterdam (NL)

(72) Inventor: Panu Perko, EJ Amsterdam (NL)

(73) Assignee: Synaptics Incorporated, San Jose, CA (US)

(*) Notice: Subject to any disclaimer, the term of this patent is extended or adjusted under 35 U.S.C. 154(b) by 0 days.

(21) Appl. No.: 18/137,354

(22) Filed: Apr. 20, 2023

(65) Prior Publication Data

US 2023/0359277 A1 Nov. 9, 2023

(30) Foreign Application Priority Data

May 9, 2022 (EP) ..................................... 22172329

(51) Int. Cl.
*G06F 3/01* (2006.01)
*G06F 3/0354* (2013.01)

(52) U.S. Cl.
CPC .......... *G06F 3/016* (2013.01); *G06F 3/03547* (2013.01)

(58) Field of Classification Search
CPC ...... G06F 3/016; G06F 3/03547; G06F 1/169; H10N 30/88
See application file for complete search history.

(56) References Cited

U.S. PATENT DOCUMENTS 9,664,577 B1* 5/2017 Liljegren .............. G01L 1/2287
2006/0109254 A1* 5/2006 Akieda ................... G06F 3/041 345/173
2010/0052489 A1* 3/2010 Nakatani ............... G06F 1/1656 312/327
2011/0261548 A1* 10/2011 Gandhi ................. H04M 1/185 361/810
2011/0304569 A1* 12/2011 Kai ..................... G06F 11/1402 345/173
2012/0319827 A1* 12/2012 Pance ..................... G06F 3/016 340/407.1
2013/0106734 A1* 5/2013 Schuler ............ H04N 21/47217 345/173
2013/0294020 A1* 11/2013 Rayner ................. G06F 1/1626 361/679.01
2014/0152890 A1* 6/2014 Rayner .................. H04N 23/51 277/312
2015/0227201 A1* 8/2015 Nakao ..................... G06F 3/041 345/156

(Continued)

FOREIGN PATENT DOCUMENTS

EP 3260953 A2 12/2017

OTHER PUBLICATIONS

Extended European Search Report for corresponding EP Application No. 22172329.9 dated Oct. 25, 2022 (8 bages).

*Primary Examiner* — Jose R Soto Lopez
(74) *Attorney, Agent, or Firm* — Leydig, Voit & Mayer, Ltd.

(57) ABSTRACT

It is an object to provide a device. According to an embodiment, a device comprises: a first layer; a second layer; and at least one intermediate layer between the first layer and the second layer, wherein the at least one intermediate layer comprises: a haptic element comprising at least one piezoelectric transducer; at least one seal element positioned on at least one side of the haptic element, and wherein the at least one seal element is configured to seal at least the haptic element between the first layer and the second layer at least on the one side.

14 Claims, 9 Drawing Sheets

(56) References Cited

U.S. PATENT DOCUMENTS

| | | | | |
|---|---|---|---|---|
| 2016/0011629 | A1* | 1/2016 | Yamaguchi | G06F 1/1656 361/679.56 |
| 2016/0371907 | A1* | 12/2016 | Ma | G06F 3/0227 |
| 2017/0017315 | A1* | 1/2017 | Laflamme | G06F 3/0488 |
| 2017/0285848 | A1* | 10/2017 | Rosenberg | G06F 3/04883 |
| 2017/0357325 | A1* | 12/2017 | Yang | G06F 3/0443 |
| 2017/0364158 | A1* | 12/2017 | Wen | G06F 3/03547 |
| 2018/0004294 | A1* | 1/2018 | Eraslan | G06F 3/016 |
| 2020/0004337 | A1* | 1/2020 | Hendren | G06F 1/1616 |
| 2021/0168231 | A1* | 6/2021 | Baker | G06F 1/1637 |
| 2021/0181897 | A1* | 6/2021 | Katsuhara | G01L 5/00 |
| 2021/0240282 | A1* | 8/2021 | Gajiwala | G06F 3/016 |
| 2021/0278293 | A1* | 9/2021 | Kinokuni | G06F 3/0447 |
| 2021/0333880 | A1* | 10/2021 | Junus | G06F 3/045 |
| 2022/0291746 | A1* | 9/2022 | Tarelli | F16F 15/1203 |
| 2022/0334645 | A1* | 10/2022 | Junus | G06F 3/045 |
| 2022/0338363 | A1* | 10/2022 | Chen | H05K 5/069 |
| 2022/0365601 | A1* | 11/2022 | Zhao | G06F 3/038 |
| 2022/0382400 | A1* | 12/2022 | Brehm | H04M 1/0266 |
| 2023/0043375 | A1* | 2/2023 | Goto | G06F 3/0445 |
| 2023/0118358 | A1* | 4/2023 | Horiuchi | H02K 5/04 310/66 |
| 2023/0315214 | A1* | 10/2023 | Lochun | G06F 1/1643 345/168 |

* cited by examiner

HAPTIC EFFECT DEVICE

TECHNICAL FIELD

The present disclosure relates to an electronic device, and more particularly to an electronic device for sensing and/or for providing a haptic effect.

BACKGROUND

Haptic effects, provided by for example haptic effect elements, such as piezoelectric transducers, can be utilized in providing a tactile sensation to a user in various applications. For example, in a touch-based user interfaces, such as in a laptop trackpad, a clicking sensation may be provided to a user without the touched surface moving significantly.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide an electronic device for sensing and/or for providing a haptic effect. The foregoing and other objects are achieved by the features of the independent claims. Further implementation forms are apparent from the dependent claims, the description and the figures.

According to a first aspect, a device comprises: a first layer; a second layer; and at least one intermediate layer between the first layer and the second layer, wherein the at least one intermediate layer comprises: a haptic element comprising at least one piezoelectric transducer; at least one seal element positioned on at least one side of the haptic element, and wherein the at least one seal element is configured to seal at least the haptic element between the first layer and the second layer at least on the one side. The device can, for example, provide improved reliability by preventing contamination from getting inside the device.

In an implementation form of the first aspect, the at least one seal element comprises polyurethane, microcellular urethane, microcellular urethane foam open cell urethane foam, closed cell urethane foam, silicone rubber, liquid silicone rubber, synthetic fibre fabric, and/or natural fibre fabric. The device can, for example, provide improved sealing of the components inside the device.

In a further implementation form of the first aspect, the at least one intermediate layer further comprises at least one adhesive element positioned on at least a first side and a second side of the haptic element, wherein the first side opposes the second side, and the at least one seal element is positioned on at least a third side of the haptic element.

In a further implementation form of the first aspect, the at least one seal element is further positioned on a fourth side of the haptic element, wherein the third side opposes the fourth side. The device can, for example, provide improved sealing by sealing the components also from the fourth side.

In a further implementation form of the first aspect, a compression load deflection of the at least one seal element is 0.5-50 kilopascal when measured according to JIS K 6254. Materials with such material parameters can, for example, provide improved sealing properties while not impairing the haptic effect provided by the device.

In a further implementation form of the first aspect, the at least one intermediate layer further comprises a capacitive sensor element positioned between the second layer and the haptic element. The device can, for example, provide improved touch detection.

In a further implementation form of the first aspect, the first layer comprise a C-cover of a laptop computer. The device can, for example, be effortlessly integrated into a laptop computer.

In a further implementation form of the first aspect, the second layer comprises a touch interface surface of a laptop computer. The device can, for example, be effortlessly integrated into a laptop computer.

In a further implementation form of the first aspect, the first layer comprises at least one depression for the haptic element and/or for the at least one seal element, and wherein the haptic element and/or the at least one seal element is positioned in the at least one depression. The device can, for example, provide improved sealing for the components positioned in the at least one depression.

In a further implementation form of the first aspect, a thickness of the at least one seal element in a direction from the first layer to the second layer is greater than a depth of the at least one depression. The thickness of the at least one seal element can enable the first layer and the second layer to move with respect to each other, thus improving the haptic effect provided by the device.

In a further implementation form of the first aspect, the first layer and/or the second layer has first length in a first planar dimension and a second length in a second planar dimension, wherein the second length is greater than the first length, and wherein the at least one seal element is configured to seal at least the haptic element between the first layer and the second layer along at least the second planar dimension. The device can, for example, seal the components along the dimensions where sealing is needed.

In a further implementation form of the first aspect, the at least one intermediate layer further comprises an electronic circuitry for controlling the haptic element and/or the capacitive sensor element. The sealing can also improve the reliability of the electronic circuitry.

In a further implementation form of the first aspect, at least one seal element is mounted to the first layer and/or to the second layer using an adhesive. The adhesive can improve sealing properties of the at least one seal element.

According to a second aspect, a laptop computer comprises the device according to the first aspect.

It is to be understood that the implementation forms of the first aspect described above may be used in combination with each other. Several of the implementation forms may be combined together to form a further implementation form.

According to a second aspect, a trackpad comprises the device according to the first aspect.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which.

In the following, like reference numerals are used to designate like parts in the accompanying drawings.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
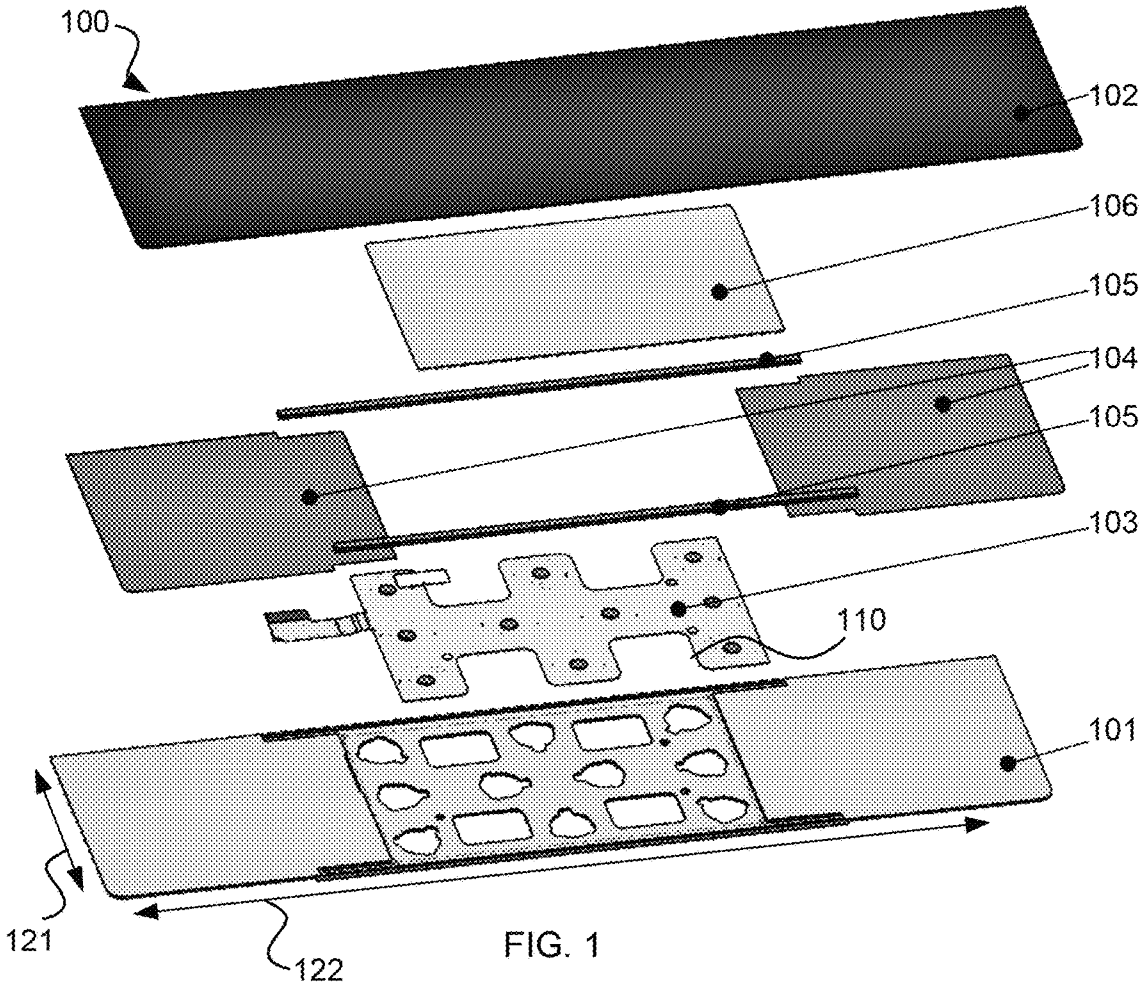
FIG. 1 illustrates an exploded-view drawing representation of a device according to an embodiment.

FIG. 1 illustrates an exploded-view drawing representation of a device 100 according to an embodiment.

The device 100 may also be referred to as device for providing haptic effect, a device for providing haptic feedback, or similar.

The cross-sectional geometry and/or dimensions presented in the embodiments herein are only exemplary and may not reflect actual geometry and/or dimensions of the parts/layers/components presented.

According to an embodiment, the device 100 comprise a first layer 101, a second layer 102, and at least one intermediate layer between the first layer 101 and the second layer 102.

The first layer 101 may also be referred to as a bottom layer, a bottom structure, a bracket, a back plate, a carrier, or similar.

According to an embodiment, the first layer 101 comprise a C-cover of a laptop computer. A C-cover may refer to a surface/face/structure of the laptop which holds a trackpad and a keyboard.

The second layer 102 may also be referred to as a top layer, a top structure, an overlay structure, or similar.

The at least one intermediate layer may also be referred to as an intermediate structure, or similar.

The at least one intermediate layer may comprise a haptic element 103 comprising at least one piezoelectric transducer 110.

The haptic element 103 may also be referred to as a haptic module, a haptics module, a haptics element, a haptic sensor, a haptic sensor module, a haptic sensor element, or similar.

The at least one piezoelectric transducer 110 may also be referred to as a piezoelectric sensor, a piezo sensor, a piezoelectric element, a haptic feedback element, a tactile feedback element, a piezo actuator, a piezoelectric actuator, a piezo transducer, or similar.

The at least one piezoelectric transducer 110 may comprise a piezoelectric material. When a voltage is applied over the at least one piezoelectric transducer 110, a strain may be induced into the at least one piezoelectric transducer 110. Thus, by applying a voltage over the at least one piezoelectric transducer 110, a haptic effect can be produced.

Although the at least one piezoelectric transducer 110 may be configured to provide a haptic effect when a voltage is applied over the at least one piezoelectric transducer 110, the at least one piezoelectric transducer 110 may also be used to detect touch on, for example, the second layer 102. When a force is applied to the second layer 102, a stress can be induced into the at least one piezoelectric transducer 110, and the stress can induce a voltage over the at least one piezoelectric transducer 110. This voltage may be detected. Moreover, if the haptic element 103 comprises a plurality of piezoelectric transducers 110, the location of the force can be deduced.

The at least one intermediate layer may further comprise at least one seal element 105 positioned on at least one side of the haptic element 103, wherein the at least one seal element 105 is configured to seal at least the haptic element 103 between the first layer 101 and the second layer 102 at least on the one side.

The third side may be different from the first and second side.

The at least one seal element 105 may also be referred to as a seal, a sealing element, or similar.

The at least one intermediate layer may further comprise at least one adhesive element 104 positioned on at least a first side and a second side of the haptic element, wherein the first side opposes the second side. The at least one seal element may be positioned on at least a third side of the haptic element 103.

The at least one adhesive element 104 may be configured to attach the first layer 101 to the second layer 102.

The at least one adhesive element 104 may also be referred to as an adhesive layer, a glue layer, or similar.

According to an embodiment, the at least one seal element 105 is further positioned on a fourth side of the haptic element 103, wherein the third side opposes the fourth side. The fourth side may be different from the first and second side. The at least one seal element 105 may be configured to seal at least the haptic element 103 between the first layer 101 and the second layer 102 at least on the third side and the fourth side.

In some embodiments, the at least one seal element 105 may be positioned also on the first side and the second side of the haptic element 103. In such embodiments, the at least one intermediate layer may comprise the at least one adhesive element 104 or not. For example, in a laptop computer, a touchpad active area may comprise the full length of palm rest area. In such cases, the adhesives on the first and second side may not be needed and the at least one seal element 105 could be attached around the touch pad.

The first, second, third, and fourth side may refer to different sides of the haptic element 103 within the intermediate layer. Thus, a direction from the first side to the second side may be substantially perpendicular to a direction from the first layer 101 to the second layer 102 and substantially perpendicular to a direction from the third direction to the fourth direction.

Herein, a layer may refer to a structure having its lateral dimensions substantially larger than its thickness. In that sense, a layer may be considered as being a thin structure. However, a layer does not need to have a uniform thickness. For example, in some embodiments disclosed herein, the thickness of a layer may vary between different sections of the layer.

The device 100 can protect the haptic element and/or other electronics and electromechanical components against contamination, such as liquids, dust, and/or other particles that may hinder operation of, for example, the transducers.

The device 100 can also improve uniformity and/or strength of haptics as well as sensitivity and uniformity of touch reignition.

According an embodiment, the intermediate layer further comprises a capacitive sensor element 106 positioned between the second layer 102 and the haptic element 103.

The capacitive sensor element 106 may be configured to detect touch on the second layer 102.

One of or both of the capacitive sensor element 106 and the haptic element 103 may be used to detect touch. Furthermore, the haptic element 103 may be used to detect magnitude of the force applied to the second layer 102. Thus, a user may use both the location of touch and the magnitude of the applied force to control the device 100 and/or an apparatus the device 100 is embodied in, such as a laptop computer.

The intermediate layer may also further comprise, for example, a printed circuit board (PCB), a PCB layer, a printed circuit board assembly (PCBA), a PCBA layer, or similar. Such circuits may be configured to, for example, control the haptic element 103 and/or the capacitive sensor element 106.

According to an embodiment, the first layer 101 and/or the second layer 102 has a first length in a first planar dimension 121 and a second length in a second planar dimension 122, wherein the second length is greater than the first length, and wherein the at least one seal element is configured to seal at least the haptic element 103 between the first layer 101 and the second layer 102 along at least the second planar dimension.

The first planar dimension 121 may be perpendicular to the second planar dimension 122. The first 121 and second planar dimension 122 may be perpendicular to a thickness dimension of the layers. The first length may also be referred to as a depth and the second length may also be referred to as width. Similarly, the first planar dimension 121 may be referred to as a depth dimension and the second planar dimension 122 may be referred to as a width dimension.

For example, in the embodiment of FIG. 1, the first planar dimension 121 corresponds to the shorter side of the first/second layer and the second planar dimension 122 corresponds to the longer side of the first/second layer.

The first planar dimension 121 may substantially parallel and/or parallel with a direction from the third side of the haptic element 103 to the fourth side of the haptic element 103. The second planar dimension 122 may substantially parallel and/or parallel with a direction from the first side of the haptic element 103 to the second side of the haptic element 103.

In the embodiment of FIG. 1, the at least one seal element 105 comprises two elongated seal elements on the third side and the fourth side of the haptic element 103 running along the second planar dimension 122.

The at least one seal element can prevent contamination from entering the device 100 and interacting with the electrical and/or mechanical components inside the device 100. This can prevent abnormal operation and/or failure of the device 100.

The at least one seal element 105 can enable sufficient movement between the first layer 101 and the second layer 102 to enable haptic effects to be provided. Further, the at least one seal element can be more robust than, for example, an adhesive.

Figure 2:
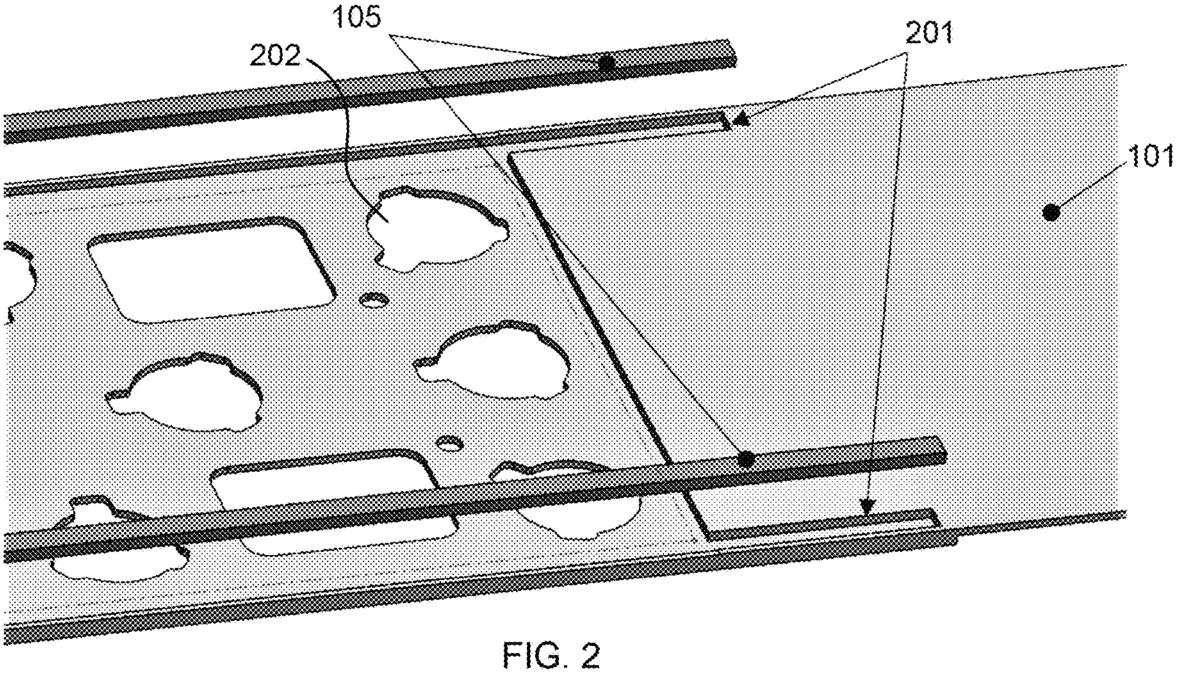
FIG. 2 illustrates a schematic representation of a first layer comprising a depression according to an embodiment.

FIG. 2 illustrates a schematic representation of a first layer comprising a depression according to an embodiment.

According to an embodiment, the first layer 101 comprises at least one depression 201 for the haptic element 103 and/or for the at least one seal element 105, and the haptic element 103 and/or the at least one seal element 105 is positioned in the at least one depression 201.

The at least one depression 201 may be in the thickness direction of the first layer 101.

A depression may refer to a section on the surface of the first layer 101 that is recessed compared to the rest of the surface.

The at least one depression 201 may also be referred to as a cavity, an indentation, a recess, a pit, a slot, or similar.

The first layer 101 may further comprise a plurality of depressions 202, wherein each depression 202 in the plurality of depressions corresponds to a piezoelectric transducer in the at least one piezoelectric actuator 110. The plurality of depressions 202 can provide sufficient room for movement of the at least one piezoelectric transducer 110 to provide a haptic effect. The at least one piezoelectric transducer 110 may be aligned with the plurality of depressions 202.

Herein, when two components are aligned, this may indicate that the components are aligned with each other in the plane the relevant layer. Thus, the components are aligned when viewed from the first side or from the second side of the relevant layer. The components may also be referred to as overlapping or as at least partially overlapping.

According to an embodiment, a compression load deflection of the at least one seal element 105 is 0.5-50 kilopascal (kPa) when measured according to JIS K 6254.

Alternatively, a compression load deflection of the at least one seal element 105 may be 0.5-30, 1-30 kPa, 0.5-20, 1-20 kPa, 2-30 kPa, 2-20 kPa, 2-15 kPa, 5-30 kPa, 5-20 kPa, or 5-15 kPa when measured according to JIS K 6254

According to an embodiment, a compression set of the at least one seal element 105 is 0.5-5 percent when measured according to JIS K 6401.

Alternatively, a compression set of the at least one seal element 105 may be 1-5%, 0.5-4%, 0.5-3%, 1-4%, 1-3%, 1.5-5%, 1.5-4%, 1.5-3%, or 1.5-2.5% when measured according to JIS K 6401.

Additionally or alternatively, a compression force deflection of the at least one seal element 105 may be 0.5-20 kPa, 1-20 kPa, 1-10 kPa, 1-7 kPa, 1-5 kPa, or 1.5-5 kPa when measured with a 0.51 cm/min strain rate and force measured at 25% deflection.

According to an embodiment, a Shore A hardness of the at least one seal element 105 is 0.5-70, 0.5 50, 1-70, 1-50, 5-70, 5-50, 10-70, 10-50, 20-70, or 20-50.

At least some of the aforementioned material parameters can provide advantageous sealing properties.

The at least one seal element may be made of a soft, spring-like material that returns into its original shape after compression.

According to an embodiment, the at least one seal element 105 comprises polyurethane, microcellular urethane, microcellular urethane foam, open cell urethane foam, closed cell urethane foam, silicone rubber, liquid silicone rubber, synthetic fibre fabric, and/or natural fibre fabric.

Alternatively, the at least one seal element 105 may comprise any other appropriate material.

In some embodiments, the at least one seal element 105 further comprises a carrier material. The carrier material may comprise, for example, polyethylene terephthalate, polyimide, and/or similar. This may be needed if, for example, the at least one seal element 105 is made of a very soft material.

The at least one seal element 105 may be made of, for example, polyurethane, microcellular urethane, microcellular urethane foam, open cell urethane foam, closed cell urethane foam, silicone rubber, liquid silicone rubber, synthetic fibre fabric, and/or natural fibre fabric.

Figure 3:
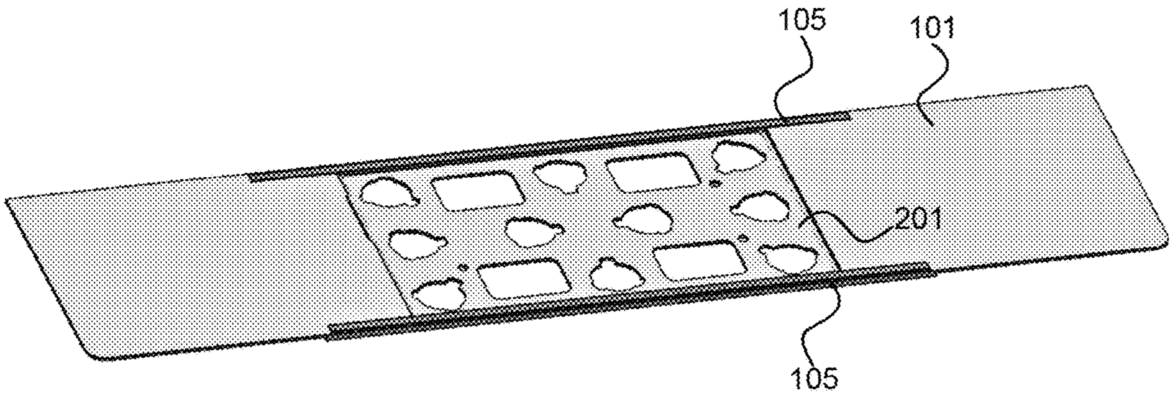
FIG. 3 illustrates a schematic representation of a first layer comprising a depression with seal elements in the depression according to an embodiment.

FIG. 3 illustrates a schematic representation of a first layer comprising a depression with seal elements in the depression according to an embodiment.

In the embodiment of FIG. 3, the depression 201 comprises two grooves/channels for two seal elements 105 and the seal elements 105 are positioned in the grooves. The grooves/channels run along the second planar dimension 122 of the first layer 101 thus sealing the haptic element 103 along the second planar dimension 122 when the device 100 is assembled. The depression 201 further comprises a section for the haptic element 103. The haptic element 103 is not illustrated.

Figure 4:
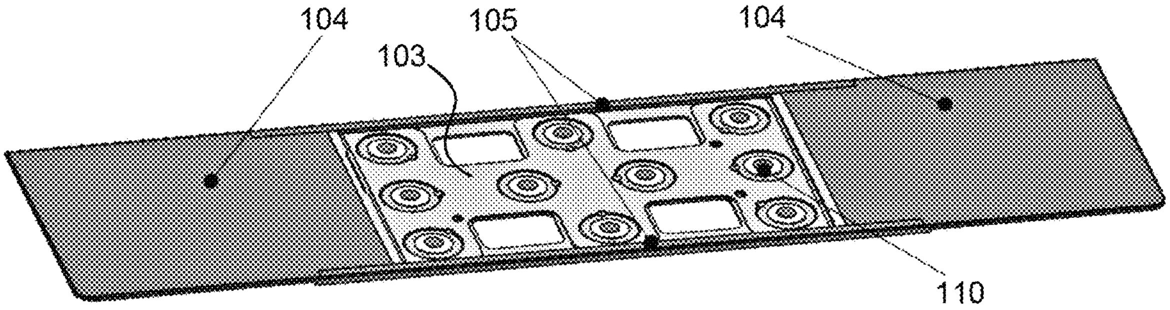
FIG. 4 illustrates a schematic representation of a first layer, seal elements, a haptic element, and an adhesive element according to an embodiment.

FIG. 4 illustrates a schematic representation of a first layer, seal elements, a haptic element, and an adhesive element according to an embodiment.

In the embodiment of FIG. 4, a first layer 101 similar to that of FIG. 3 is illustrated. In the embodiment of FIG. 4, the haptic element 103 and the at least one adhesive element 104 are also illustrated on the first layer 101.

Figure 5:
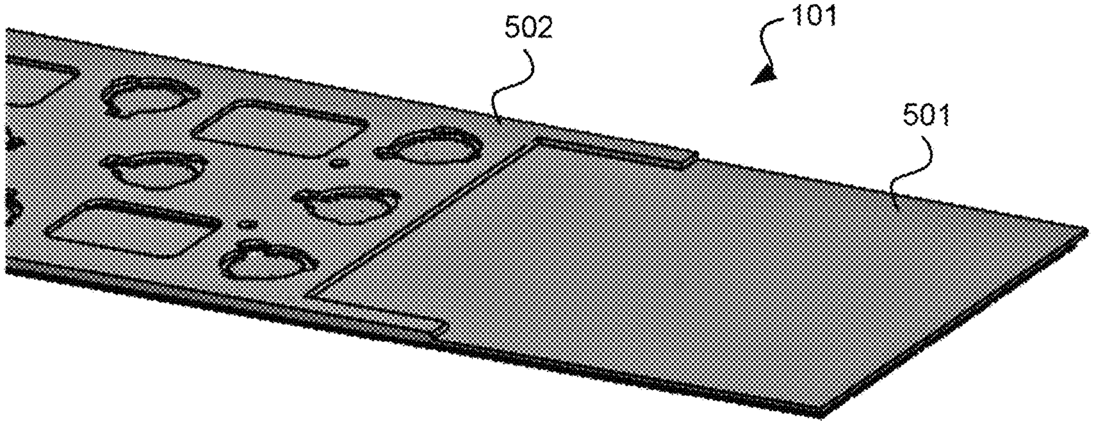
FIG. 5 illustrates a schematic representation of the first layer from the side of the first layer according to an embodiment.

FIG. 5 illustrates a schematic representation of the first layer from the side of the first layer according to an embodiment.

The at least one depression 201 may be manufactured into the first layer 101 by, for example, manufacturing, such as machining, at least one hole in the desired shape of the at least one depression 201 into a first plate 501. A second plate 502 can then be attached onto the first plate 501. The first 501 and second plate 502 thus form the first layer 101. Similarly, the plurality of depressions 202 can be manufactured by manufacturing, such as machining, a plurality of holes in the desired shape of the plurality of depressions 202 into a second plate 502. Alternatively, the first layer 101 may be manufactured from a single part/plate.

Figure 6:
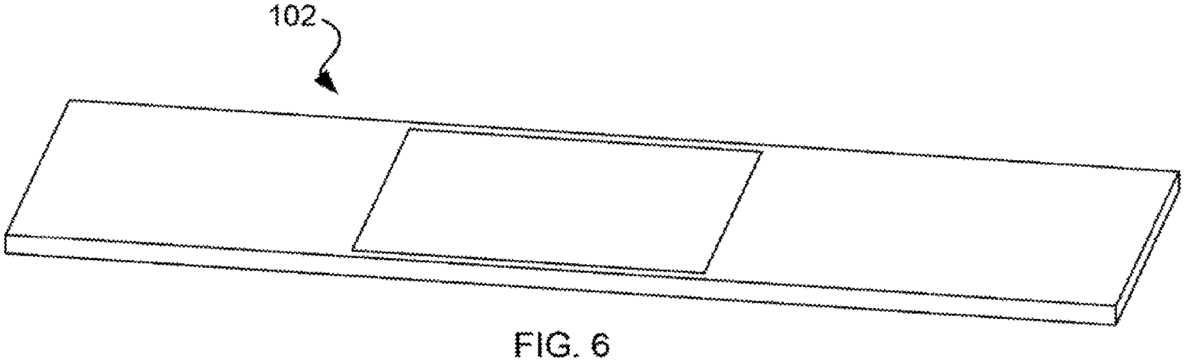
FIG. 6 illustrates a schematic representation of a second layer according to an embodiment.

FIG. 6 illustrates a schematic representation of a second layer according to an embodiment.

According to an embodiment, the second layer 102 comprises a touch interface surface of a laptop computer.

The touch-interface surface may be at least partially unobstructed. A user may touch the unobstructed part of the touch-interface surface and the device 100 may detect the touches and/or provide a haptic effect/feedback for the user via the touch-interface surface.

In a typical usage scenario of the device 100, the touch-interface surface may be facing up. This may be the case, for example, when the device 100 is embodiment in a trackpad of a laptop computer.

The touch-interface surface may also be referred to as a touch interface, a touch surface, a touch pad, a track pad, or similar.

Figure 7:
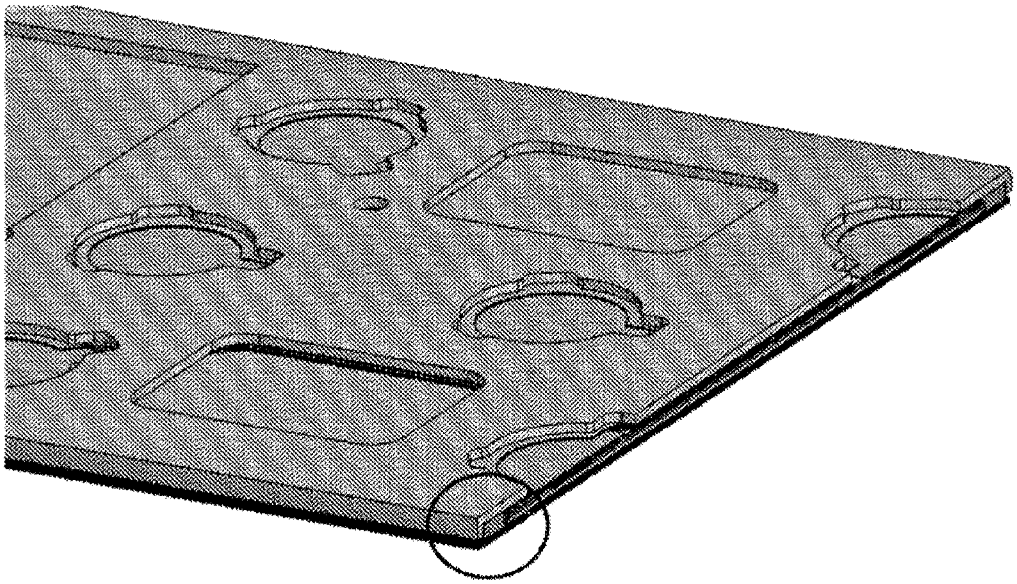
FIG. 7 illustrates a schematic representation of a device from the side of the first layer according to an embodiment.

FIG. 7 illustrates a schematic representation of a device from the side of the first layer according to an embodiment.

Figure 8:
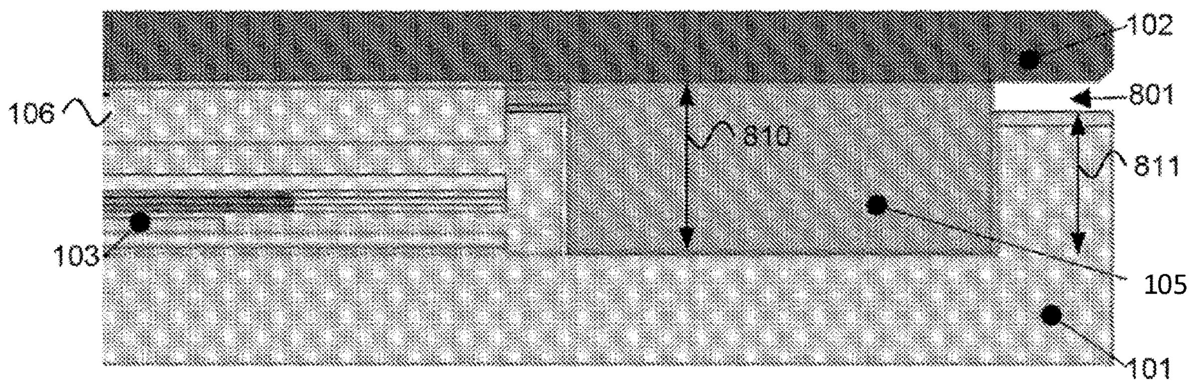
FIG. 8 illustrates a cross-sectional representation of the device according to an embodiment.

A cross-sectional view of the circled section illustrated in the embodiment of FIG. 7 is illustrated in the embodiment of FIG. 8.

FIG. 8 illustrates a cross-sectional representation of the device according to an embodiment.

According to an embodiment, a thickness 810 of the at least one seal element 105 in a direction from the first layer 101 to the second layer 102 is greater than a depth 811 of the at least one depression 201.

Such a thickens of the at least one seal element 105 allows an airgap 801 to form between the first layer 101 and the second layer 102. The airgap 801 can allow movement between the first layer 101 and the second layer 102. This can improve the haptic effect provided by the device 100.

The airgap 801 can be along the second planar dimension 122 as illustrated in the embodiment of FIG. 8. The airgap 801 can be on at least the third and fourth side of the haptic element 103. The airgap 801 can be below an edge of the second layer 102.

The thickness 810 of the at least one seal element 105 may be in the range 0.1-10 millimetres (mm), 0.1-5 mm, 0.1-3 mm, 0.1-2 mm, 0.5-3 mm, 0.5-2 mm, or 0.2-1 mm. The thickness may be measured before the seal element 105 is installed into the device 100.

According to an embodiment, the at least one intermediate layer further comprises an electronic circuitry for controlling the haptic element 103 and/or the capacitive sensor element 106.

The electronic circuitry may comprise, for example, an analogue front end (AFE), a system on chip (SoC), a field-programmable gate array (FPGA), a controller chip, an application specific integrated circuit (ASIC), such as a booster chip, and/or other surface mount technology (SMT) components.

For example, the electronic circuitry, the haptic element 103, and the capacitive sensor element 106 may be implemented as a printed circuit board assembly (PCBA). Thickness 810 of the at least one seal element 105 may be greater than the thickness of the PCBA.

According to an embodiment, the intermediate layer further comprises a PCBA and the PCBA comprises the haptic element 103, the capacitive sensor element 106, and/or the electronic circuitry.

According to an embodiment, a thickness 810 of the at least one seal element 105 in a direction from the first layer 101 to the second layer 102 is greater than a thickness of the PCBA direction in the direction from the first layer 101 to the second layer 102.

According to an embodiment, the at least one seal element 105 is mounted to the first layer 101 and/or to the second layer 102 using an adhesive.

Alternatively, there may be no adhesive between the at least one seal element 105 and the first layer 101 and between the at least one seal element 105 and the second layer 102.

Figure 9:
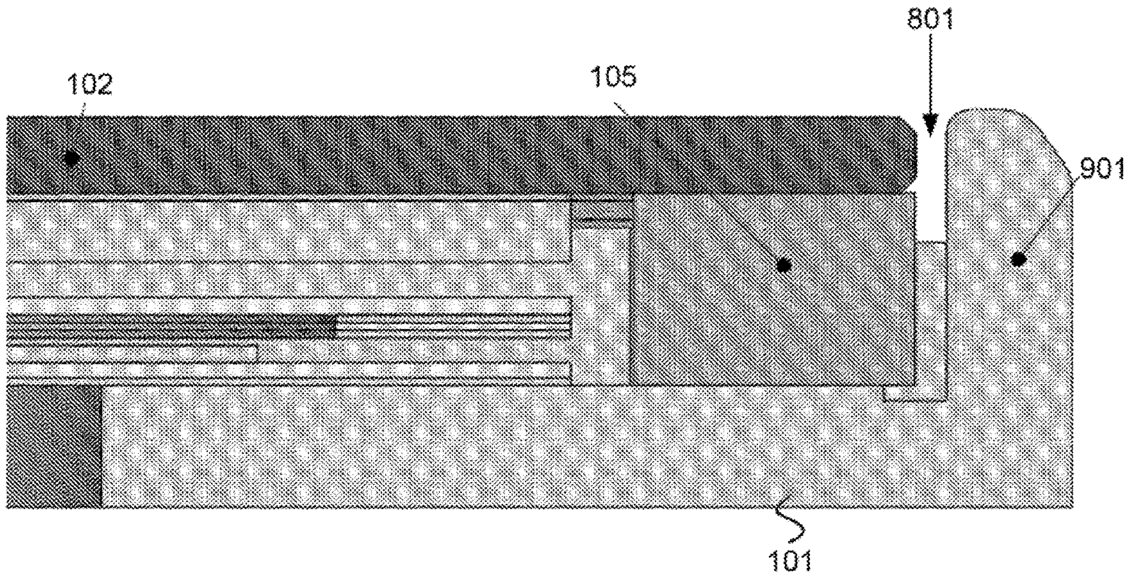
FIG. 9 illustrates a cross-sectional representation of the device according to another embodiment.

FIG. 9 illustrates a cross-sectional representation of the device according to another embodiment.

In the embodiment of FIG. 9, the device 100 further comprises a bezel 901. The bezel 901 can be made of, for example, plastic or metal, such as aluminium. The bezel 901 can prevent contamination from entering the airgap 801. The bezel 901 can run along the second planar dimension 122 on the third and/or fourth side of the haptic element 103. The at least one seal element 105 may be between the haptic element 103 and the bezel 901. The bezel 901 can obscure the airgap 801 when viewed along the first planar dimension 121.

Figure 10:
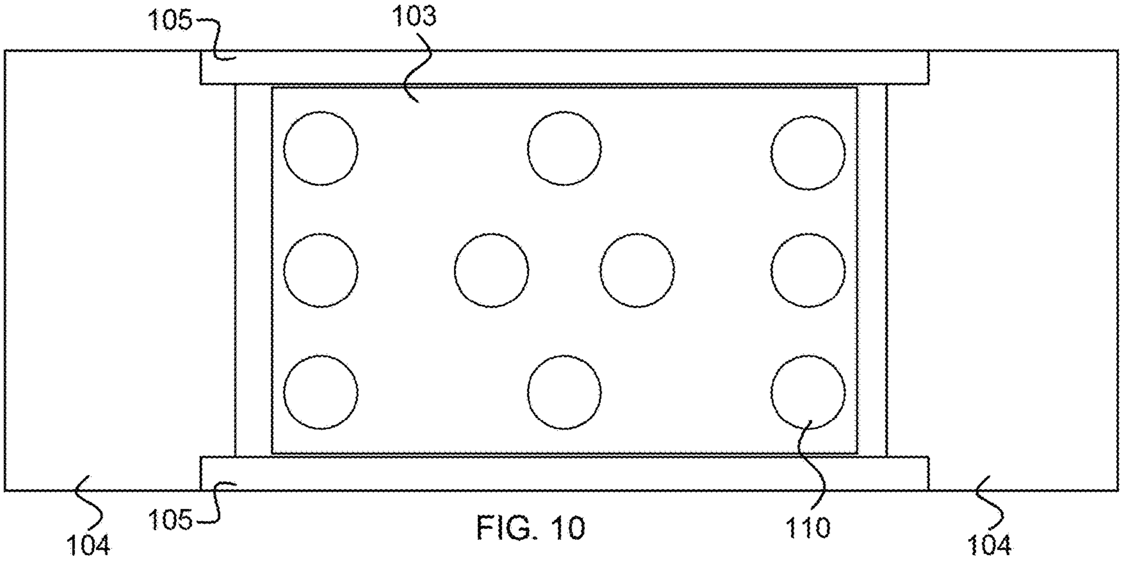
FIG. 10 illustrates a schematic representation of an intermediate layer according an embodiment.

FIG. 10 illustrates a schematic representation of an intermediate layer according an embodiment.

Figure 11:
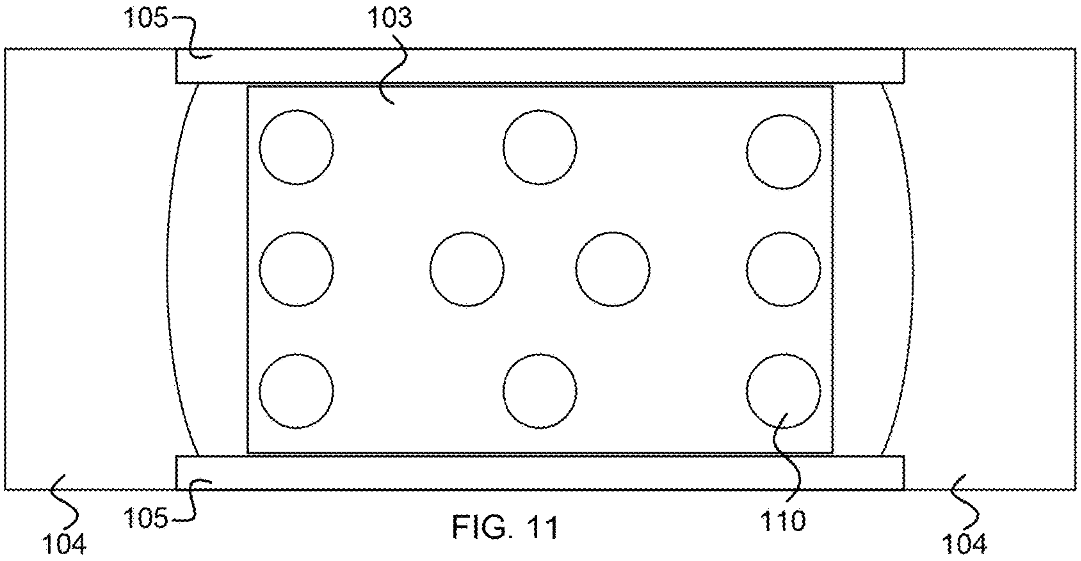
FIG. 11 illustrates a schematic representation of an intermediate layer according another embodiment.

FIG. 11 illustrates a schematic representation of an intermediate layer according another embodiment.

Figure 12:
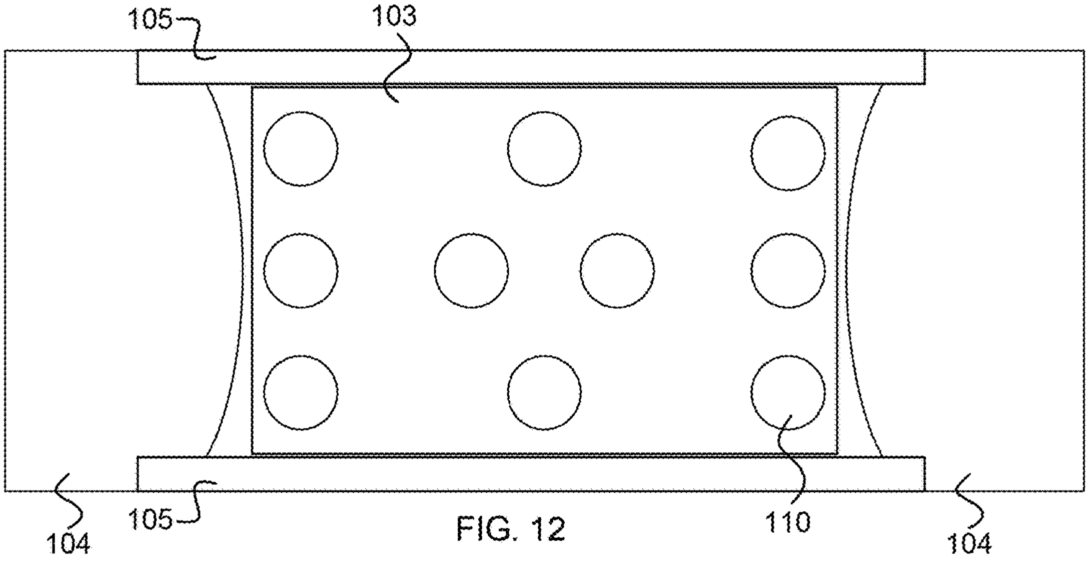
FIG. 12 illustrates a schematic representation of an intermediate layer according another embodiment.

FIG. 12 illustrates a schematic representation of an intermediate layer according another embodiment.

In the embodiments of FIGS. 9-11, the at least one seal element 105 comprises two seal elements positioned on the third and fourth side of the haptic element 103. Various shapes for the at least one adhesive element 104 are illustrated in the embodiments of FIGS. 9-11.

Figure 13:
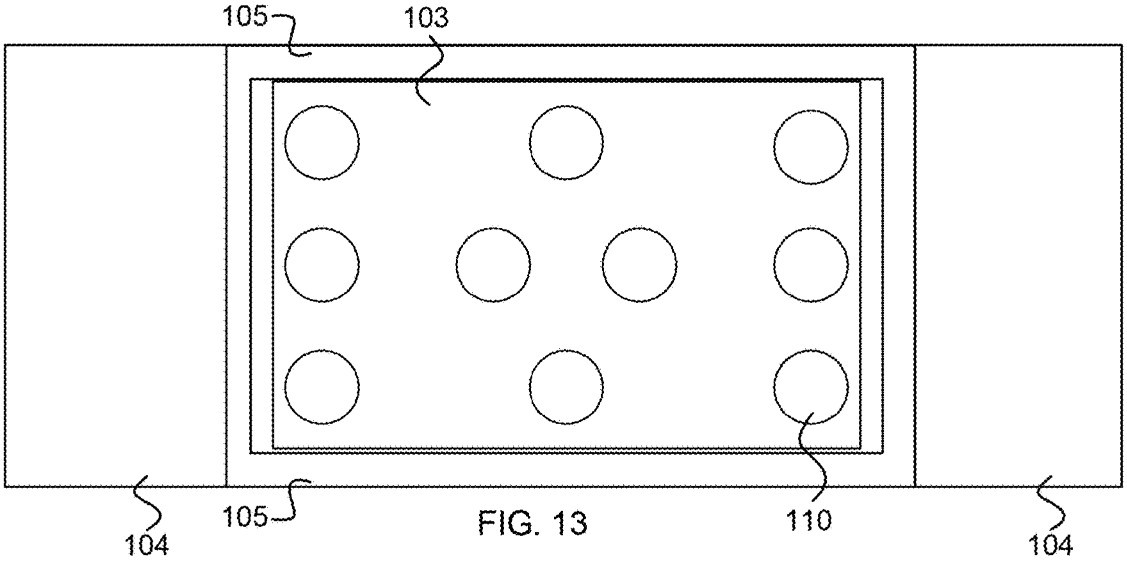
FIG. 13 illustrates a schematic representation of an intermediate layer according another embodiment.

FIG. 13 illustrates a schematic representation of an intermediate layer according another embodiment.

Figure 14:
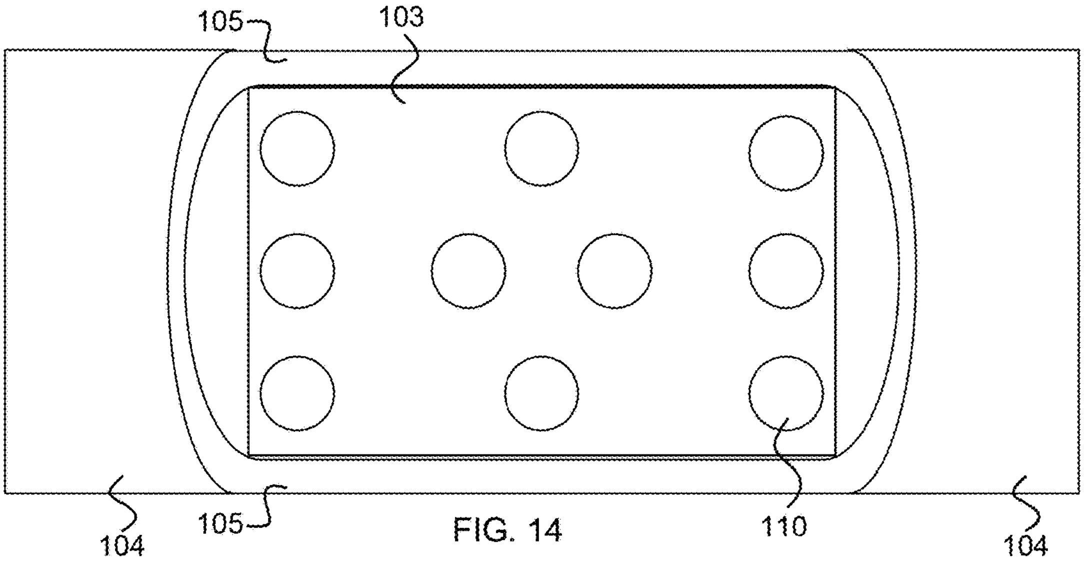
FIG. 14 illustrates a schematic representation of an intermediate layer according another embodiment.

FIG. 14 illustrates a schematic representation of an intermediate layer according another embodiment.

Figure 15:
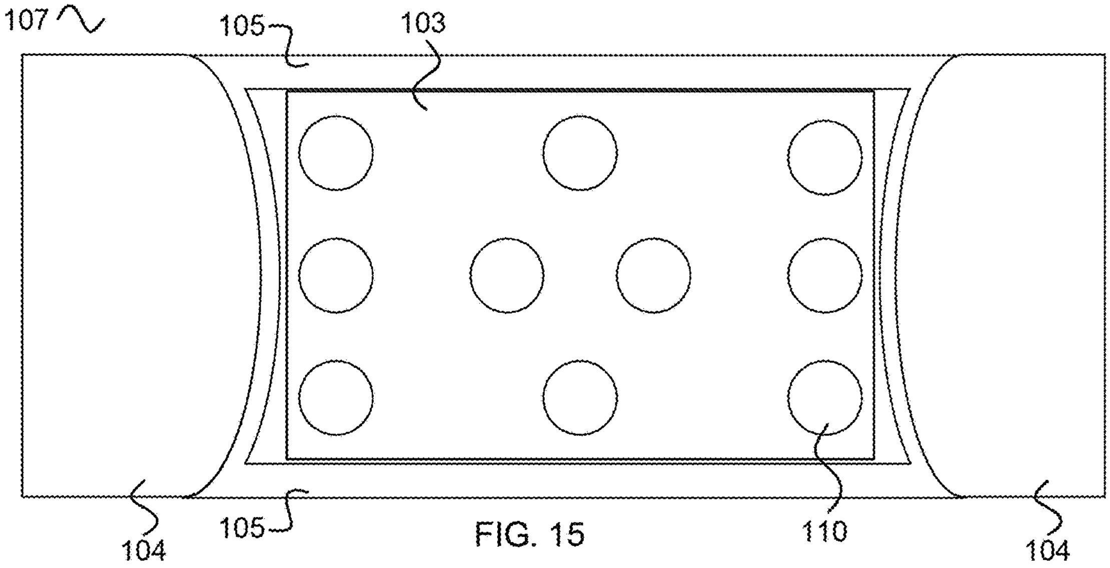
FIG. 15 illustrates a schematic representation of an intermediate layer according another embodiment.

FIG. 15 illustrates a schematic representation of an intermediate layer according another embodiment.

In the embodiments of FIGS. 12-14, the at least one seal element 105 comprises a seal element encircling the haptic element 103. Thus, the seal element 105 is positioned on the first, second, third, and fourth side of the haptic element 103. Various shapes for the seal element 105 and for the adhesive element 104 are also illustrated in the embodiments of FIGS. 12-14.

Figure 16:
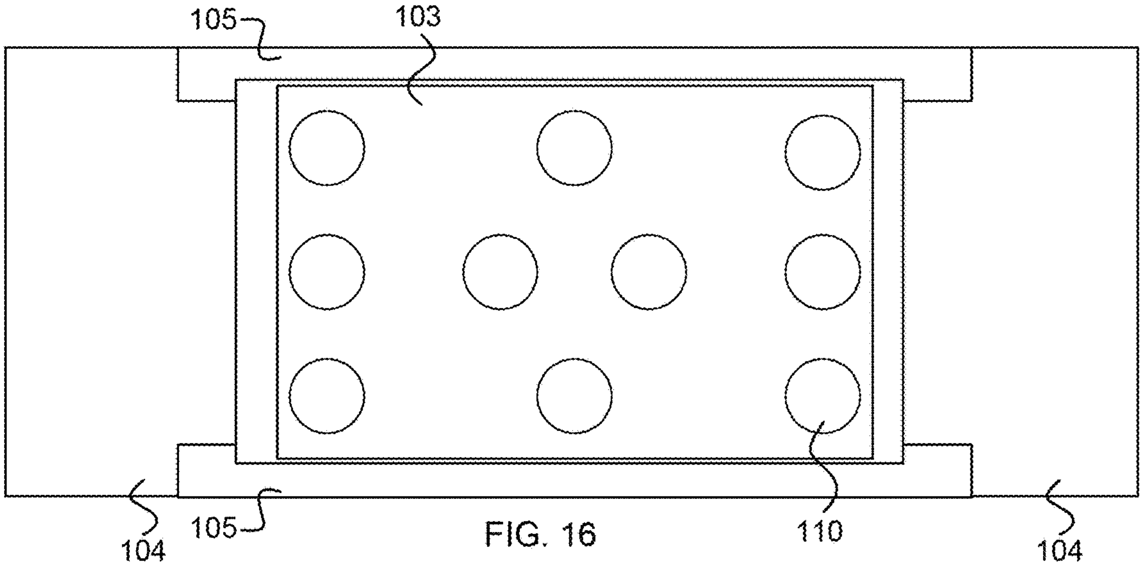
FIG. 16 illustrates a schematic representation of an intermediate layer according another embodiment.

FIG. 16 illustrates a schematic representation of an intermediate layer according another embodiment.

In the embodiment of FIG. 16, the at least one seal element 105 comprises two seal elements positioned on the third and fourth side of the haptic element 103. Further, the width of the seal elements 105 changes along the second planar dimension 122.

Figure 17:
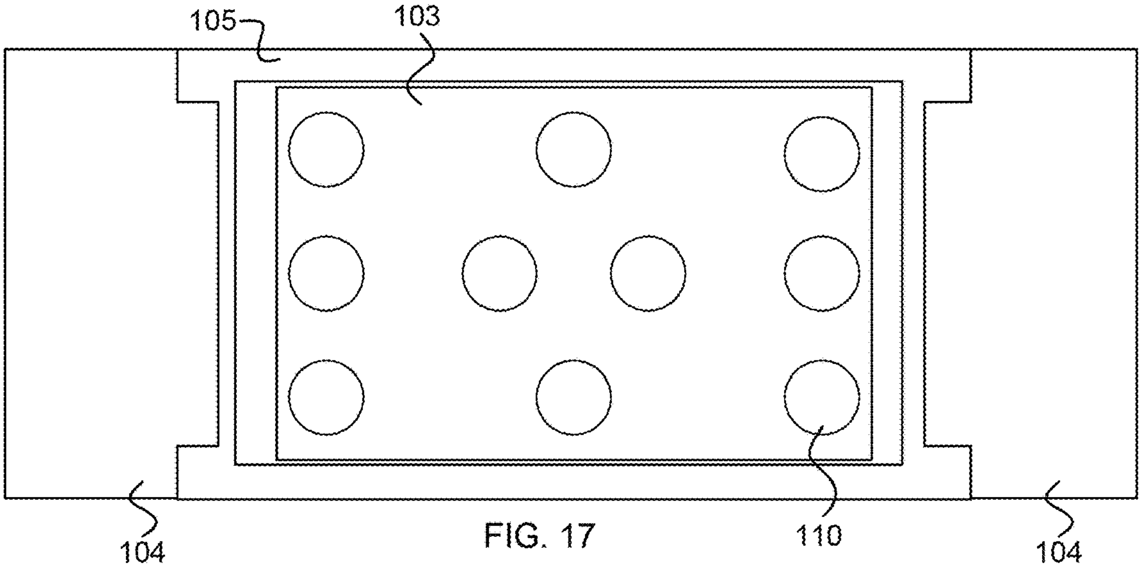
FIG. 17 illustrates a schematic representation of an intermediate layer according another embodiment.

FIG. 17 illustrates a schematic representation of an intermediate layer according another embodiment.

Figure 18:
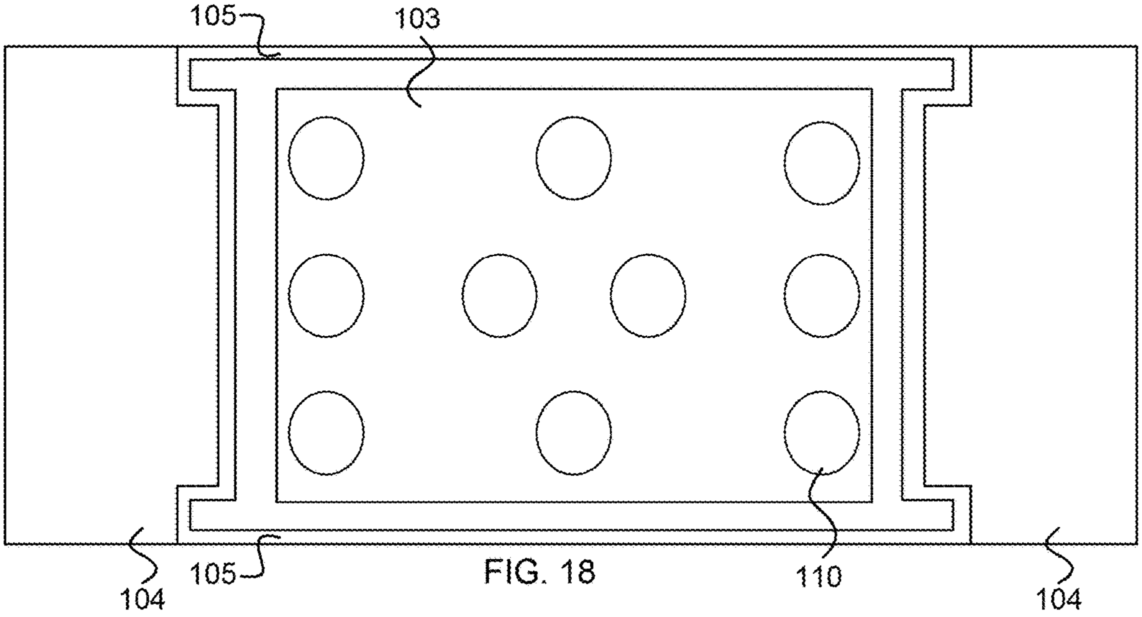
FIG. 18 illustrates a schematic representation of an intermediate layer according another embodiment.

FIG. 18 illustrates a schematic representation of an intermediate layer according another embodiment.

Figure 19:
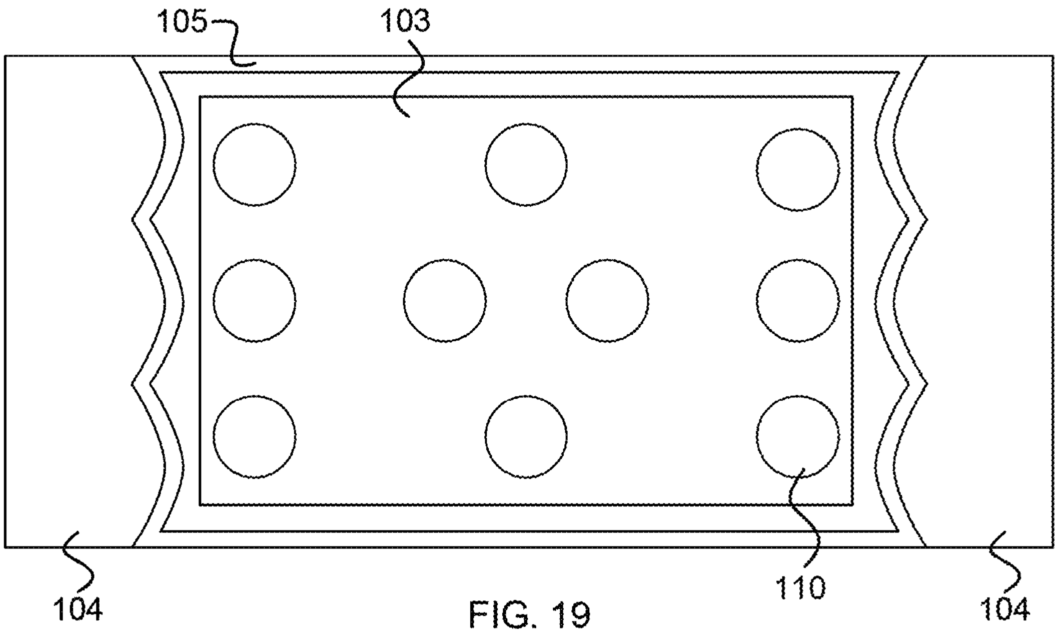
FIG. 19 illustrates a schematic representation of an intermediate layer according another embodiment.

FIG. 19 illustrates a schematic representation of an intermediate layer according another embodiment.

Figure 20:
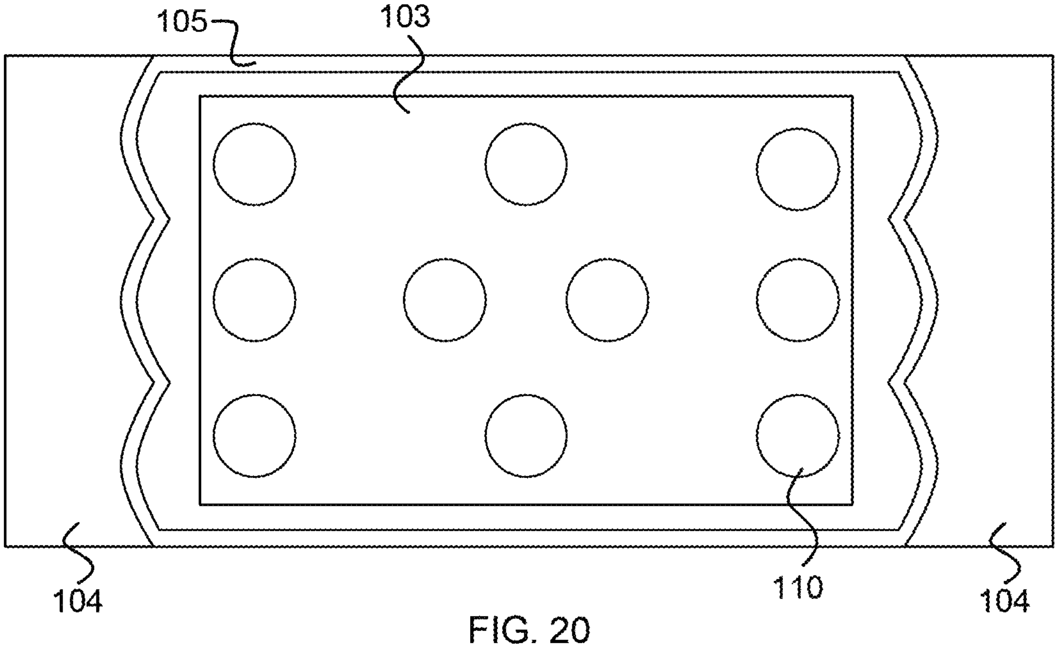
FIG. 20 illustrates a schematic representation of an intermediate layer according another embodiment.

FIG. 20 illustrates a schematic representation of an intermediate layer according another embodiment.

In the embodiments of FIGS. 16-19, the at least one seal element 105 comprises a seal element encircling the haptic element 103. Thus, the seal element 105 is positioned on the first, second, third, and fourth side of the haptic element 103. Various shapes for the seal element 105 and for the adhesive element 104 are illustrated in the embodiments of FIGS. 16-19. The shape of the at least one seal element 105 can affect the haptic effect provided by the haptic element 103 by affecting the uniformity and/or strength near the edges and corners.

Figure 21:
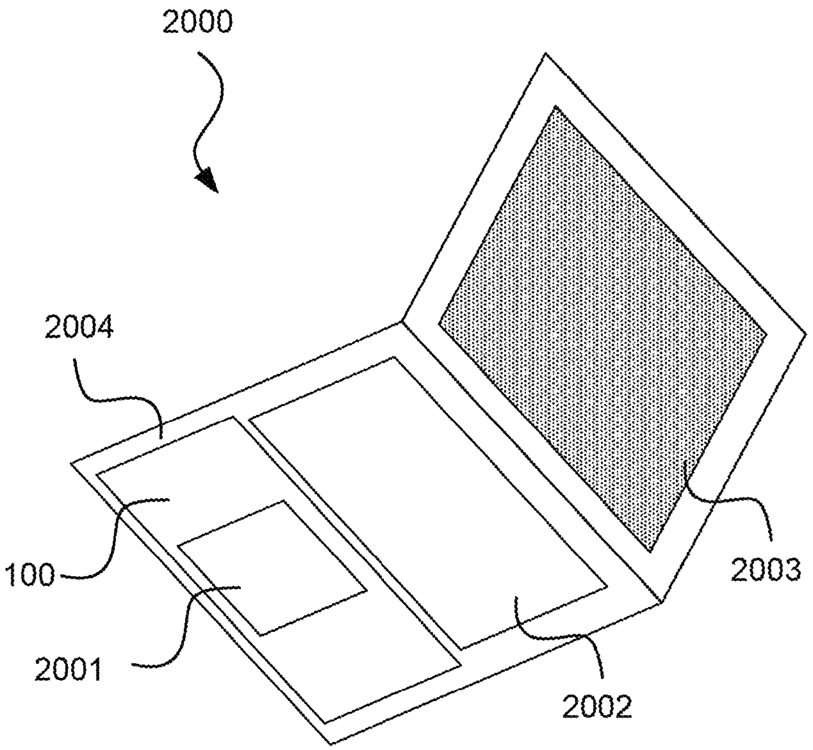
FIG. 21 illustrates a schematic representation of a laptop computer according to an embodiment.

FIG. 21 illustrates a schematic representation of a laptop computer according to an embodiment.

The laptop computer 2000 may comprise a trackpad 2001. The laptop computer 2000 may further comprise a keyboard 2002, a screen 2003, and a chassis 2004. The laptop computer 2000 may further comprise various other components not depicted in the embodiment of FIG. 21.

According to an embodiment a laptop computer 2000 comprises the device 100.

For example, the device 100 may be used to implement the trackpad 2001 of the laptop computer 2000. The trackpad 2001 may also be referred to as a touchpad or similar. A user may operate the laptop computer 2000 using the trackpad 2001. The device 100 can provide haptic effects to the user. The device 100 may be controlled by the laptop computer 2000. For example, when a user clicks on an icon on the computer 2000 using the trackpad 2001, the device 100 can provide a haptic effect to the user in response. The haptic effect can be controlled by, for example, the operating system of the laptop computer 2000.

The device 100 may comprise, for example, a controller. The controller may control, for example, the haptic element 103 of the device 100. The device 100 may further comprise an analogue front end (AFE) and/or a booster circuitry/ASIC. The booster circuitry/ASIC can be configured to provide a high voltage for driving the at least one piezoelectric transducer 110. The booster circuit/ASIC may also be referred to as a voltage booster circuit/ASIC or similar.

The laptop computer 2000 may comprise a processor. The laptop computer 2000 may further comprise a memory. The processor may control, for example, the haptic element 103 of the device 100 via, for example, the controller and/or the AFE.

The memory may comprise program code, such as drivers, that cause the laptop computer 2000 to interface with the device 100 when the program code is executed on the processor. Interfacing with the device 100 may comprise, for example, transmitting signals that cause the piezoelectric transducers of the haptic element 103 in the device 100 to provide a haptic effect to the user and/or receiving signals from the device 100 that correspond to a user touching the touch-interface surface of the device 100.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:

a first layer comprising at least one depression;

a second layer disposed opposite the first layer; and at least one intermediate layer between the first layer and the second layer, wherein the at least one intermediate layer comprises:

a haptic element comprising at least one piezoelectric transducer;

at least one adhesive element positioned on at least a first side and a second side of the haptic element, wherein the first side opposes the second side, the at least one adhesive element attaches the first layer to the second layer; and at least one seal element located within the at least one depression and positioned laterally adjacent at least a third side of the haptic element such that the at least one seal element is not placed on top of the haptic element, the third side transverse to the first and second sides of the haptic element, wherein the at least one seal element is configured to seal at least the haptic element between the first layer and the second layer at least on the third side, wherein a thickness of the at least one seal element in a direction from the first layer to the second layer is greater than a depth of the at least one depression, and wherein a portion of the at least one seal element extending beyond the depth of the at least one depression forms a contact with the second layer, thereby forming an airgap between the first layer and the second layer.

2. The device according to claim 1, wherein the at least one seal element comprises polyurethane, microcellular urethane, microcellular urethane foam open cell urethane foam, closed cell urethane foam, silicone rubber, liquid silicone rubber, synthetic fiber fabric, and/or natural fiber fabric.

3. The device according to claim 1, wherein the at least one seal element is further positioned on a fourth side of the haptic element, wherein the third side opposes the fourth side.

4. The device according to claim 1, wherein a compression load deflection of the at least one seal element is 0.5-50 kilopascal when measured according to JIS K 6254.

5. The device according to claim 1, wherein the at least one intermediate layer further comprises a capacitive sensor element positioned between the second layer and the haptic element.

6. The device according to claim 1, wherein the first layer comprises a C-cover of a laptop computer.

7. The device according to claim 1, wherein the second layer comprises a touch interface surface of a laptop computer.

8. The device according to claim 1, wherein the first layer and/or the second layer has first length in a first planar dimension and a second length in a second planar dimension, wherein the second length is greater than the first length, and wherein the at least one seal element is configured to seal at least the haptic element between the first layer and the second layer along at least the second planar dimension.

9. The device according to claim 1, wherein the at least one intermediate layer further comprises an electronic circuitry for controlling the haptic element and/or a capacitive sensor element.

10. The device according to claim 1, wherein the at least one seal element is mounted to the first layer and/or to the second layer using an adhesive.

11. A laptop computer comprising the device according to claim 1.

12. The device according to claim 8, wherein a distance between the first layer and the second layer is in a third dimension that is perpendicular to the first planar dimension and the second planar dimension, and wherein both the at least one seal element and the haptic element are positioned along the third dimension such that the at least one seal element is parallel to the haptic element along the third dimension.

13. The device according to claim 1, further comprising:

at least one bezel positioned laterally adjacent the third side of the haptic element, wherein the at least one seal element is disposed between the haptic element and the at least one bezel.

14. The device according to claim 13, wherein the at least one bezel is composed of plastic or metal.

* * * * *